(12) United States Patent
Clark

(10) Patent No.: US 9,533,213 B2
(45) Date of Patent: Jan. 3, 2017

(54) WEB-BASED SCORING SYSTEM FOR GOLF TOURNAMENTS

(71) Applicant: Chris M. Clark, Nashville, TN (US)

(72) Inventor: Chris M. Clark, Nashville, TN (US)

( * ) Notice: Subject to any disclaimer, the term of this patent is extended or adjusted under 35 U.S.C. 154(b) by 227 days.

(21) Appl. No.: 14/072,349

(22) Filed: Nov. 5, 2013

(65) Prior Publication Data

US 2014/0058547 A1 Feb. 27, 2014

Related U.S. Application Data

(60) Provisional application No. 61/784,539, filed on Mar. 14, 2013.

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| A63B 71/06 | (2006.01) | |
| G06Q 10/10 | (2012.01) | |

(52) U.S. Cl.
CPC ........... *A63B 71/06* (2013.01); *A63B 71/0669* (2013.01); *G06Q 10/101* (2013.01); *A63B 2102/32* (2015.10); *A63B 2225/15* (2013.01); *A63B 2225/20* (2013.01); *A63B 2225/50* (2013.01)

(58) Field of Classification Search
USPC ............... 463/20, 25, 39, 40, 42; 700/92
See application file for complete search history.

(56) References Cited

U.S. PATENT DOCUMENTS

| | | | |
|---|---|---|---|
| 2002/0099936 A1* | 7/2002 | Kou et al. ...................... 713/151 |
| 2004/0023734 A1* | 2/2004 | McClain ............ A63B 24/0084 473/409 |
| 2004/0215482 A1* | 10/2004 | Davila .............................. 705/1 |
| 2005/0096761 A1* | 5/2005 | Hanover et al. ................ 700/92 |
| 2006/0241795 A1* | 10/2006 | Weingardt et al. ............. 700/91 |
| 2008/0167737 A1* | 7/2008 | Schmidt .......................... 700/92 |
| 2012/0053708 A1* | 3/2012 | Bonito ............................ 700/92 |
| 2013/0274905 A1* | 10/2013 | Berghane ............... A63B 71/06 700/92 |

* cited by examiner

*Primary Examiner* — Adetokunbo O Torimiro
(74) *Attorney, Agent, or Firm* — Luedeka Neely Group, P.C.; Mark Crockett; Rick Barnes

(57) ABSTRACT

A web-based scoring system for golf tournaments utilizes web-enabled mobile devices for entering scores. The system provides a streamlined scoring process that leverages modern technology using only web browsers on the mobile devices. The system handles all authentications and scorer positioning in the tournament using URL/hyperlinks entered on the mobile devices. The system does not require a special scoring application to be loaded to the mobile devices.

9 Claims, 11 Drawing Sheets

Round 2 Settings

| Date | Oct. 21, 2013 |
|---|---|
| Course | Blackhorse Golf Course |
| Team Ordering | Same as Previous |
| Player Ordering | Descending |

Tee Times

| First Tee Time | 1 p.m. |
|---|---|
| Minutes Between | 9 |
| Tee Time Layout | Shotgun Start |
| Tee Time Group Size | Threesome |

Live Scoring

| Scoring Setup | Hole Groups |
|---|---|
| Scoring Hole Group Breakdown | Every 3 Holes |

*FIG. 5*

Round 2 Scorer Management

Round 2 is open to Live Scoring

Scoring Setup : Hole Groups

NOTE: Your Scoring Platform will need to access the Live Scoring Link below to submit scores for live display.

| Holes | Live Scoring Link | First Tee Time | Last Tee Time Entered | Access Scoring/Print Form | |
|---|---|---|---|---|---|
| 1,2,3 | http://bfire.co/4cad | 5. 1:00 pm (3a) | | Access | 🖨 |
| 4,5,6 | http://bfire.co/a4d3 | 8. 1:00 pm (6) | | Access | 🖨 |
| 7,8,9 | http://bfire.co/8f69 | 13. 1:00 pm (9a) | | Access | 🖨 |
| 10,11,12 | http://bfire.co/99ba | 16. 1:00 pm (12) | | Access | 🖨 |
| 13,14,15 | http://bfire.co/327c | 21. 1:00 pm (15) | | Access | 🖨 |
| 16,17,18 | http://bfire.co/554c | 28. 1:00 pm (18a) | | Access | 🖨 |

Print All Round 2 Scoring Sheets

If you are playing 2 rounds this day click HERE to setup the Second Round for Oct. 21, 2013

*FIG. 6*

Scorer Sheet : Round 2 SHOTGUN FORMAT
Otter Invitational
Oct 21-22, 2013
@ Blackhorse Golf Course Holes 1,2,3
Access @ http://bfire.co/4cad

| Your Order | Group | Starting Hole | Team | Players | Scores |
|---|---|---|---|---|---|
| 1 | 5 | 3A | CSU Monterey Bay<br>Barry<br>Hawaii-Hilo | Robby Salomon<br>Marcelo Huarte<br>Christian Agosto | — — —<br>— — —<br>— — — |
| 2 | 4 | 3B | CSU Monterey Bay<br>Barry<br>Hawaii-Hilo | Matt Ogden<br>Mario Beltran<br>Kyeton Littel | — — —<br>— — —<br>— — — |
| 3 | 3 | 2 | CSU Monterey Bay<br>Barry<br>Hawaii-Hilo | Anton Rosen<br>Eirik Groenhaug<br>Chris Shimomura | — — —<br>— — —<br>— — — |
| 4 | 2 | 1A | CSU Monterey Bay<br>Barry<br>Hawaii-Hilo | Dylan Jackson<br>Jared Dalga<br>Dalen Yamauchi | — — —<br>— — —<br>— — — |

*FIG. 7*

Otter Invitational
W Team
Oct. 21 to Oct. 22, 2013 Hosted by California State University Monterey Bay @ Seaside, CA Scorecard | Pairings | Course | Stats | Scoring
Current | Past Round 2    Tee Time 5, 1:00 pm (3a)

Player                          Hole #   3
                                         Par 4

Robby Salomon
CSU Monterey Bay

Marcelo Huarte
Barry

Christian Agosto
Hawaii-Hilo

Verify »

WEB-BASED SCORING SYSTEM FOR GOLF TOURNAMENTS

FIELD

This invention relates to the field of scoring systems for sporting events. More particularly, this invention relates to a web-based scoring system for golf tournaments that is device/user independent and is implemented using a mobile communication device.

BACKGROUND

Many golf tournaments do not have live scoring due to unavailability of educated, willing, and technologically savvy volunteers/scorers to record the scores. Current scoring systems require radios or devices with preloaded applications. This increases the overhead for tournament administration to provide live scoring tracking and live updated web scoreboards because they must invest in cultivating and educating scorers. The tournament staff must also make sure that these scorers have the proper devices, as well as being properly setup and/or configured.

Current scoring systems do not provide a service that utilizes the crowd and the devices they currently own, are familiar with, and carry on a daily basis. Rather, they are more rigid systems that have limited usability because tournament staff must invest in cultivating volunteers and educating them on the technology and process involved in the use of these systems, thus limiting the usability and acceptance of live scoring.

What is needed, therefore, is a streamlined scoring process for golf tournaments and other sporting events that leverages modern technology. To obviate the necessity of investing in, cultivating and educating volunteers on the mechanics and process of using other scoring devices, a system is needed that handles all authentications, provides exact scorer positioning in the tournament via a URL/hyperlink entered into a mobile web-enabled device, and allows scorers to enter scores. This need applies to golf tournaments as well as other sports and sporting events.

SUMMARY

The above and other needs are met by a web-based scoring method for scoring a golf tournament. The method may be implemented on a tournament server computer and web-enabled mobile devices used by scorekeepers at the tournament. The web-enabled mobile devices are in communication with the tournament server computer via a communication network. In preferred embodiments, the tournament server computer includes a processor, a memory, a database, and a software program comprising computer-executable code that when executed causes the processor to perform scoring operations. A preferred embodiment of the method comprises the following steps:

(a) Information about the golf tournament is received and stored in the tournament server. The information may include the number of rounds to be played, the scoring method, tee times or tee groups, player information for players in the tournament, and scorekeeper information for scorekeepers in the tournament.

(b) Unique identifiers are generated and associated in the database with each scorekeeper. Each of the unique identifiers are associated with a corresponding scoring position.

(c) The unique identifiers are delivered to the scorekeepers associated with unique identifiers.

(d) A request is submitted via the communication network from a web-enabled mobile device used by a scorekeeper. The request includes one of the unique identifiers.

(e) The request is received at the tournament server, and the tournament server verifies that the information accompanying the request and the unique identifier correspond to information stored in the memory for that unique identifier.

(f) A cookie is generated at the tournament server and the cookie is associated with the unique identifier in the database.

(g) The cookie is delivered to the scorekeeper's mobile device and a session is established with the mobile device via the communication network.

(h) A request containing the cookie is submitted from the scorekeeper's mobile device to enter scoring information.

(i) Based on the cookie in the request, the tournament server determines the unique identifier associated with the cookie in the database.

(j) Based on the unique identifier determined in step (i), the tournament server determines access rights and a current scoring position and grants access to enter scoring information in accordance with the access rights.

(k) A web-based form is generated for the current scoring position.

(l) The web-based form is displayed on the scorekeeper's web-enabled mobile device.

(m) The scorekeeper enters score information for the current scoring position on the web-based form using the web-enabled mobile device.

(n) The web-based form with the score information for the current scoring position is submitted to the tournament server via the communication network.

(o) The tournament server receives the web-based form having the score information entered by the scorekeeper, and the score information is saved to the memory.

(p) Steps (h)-(o) are repeated until score information for all the scoring positions for the tournament has been submitted to the tournament server.

(q) The score information submitted on the web-based forms is tabulated to determine the total scores for the players in the tournament, and the scores are posted to a publicly accessible webpage.

In some preferred embodiments, step (c) includes delivering the unique identifiers to each scorekeeper via an email message, a text message, a web page or a paper message.

In some preferred embodiments, the request submitted in step (d) is a hyperlink entered into a browser application running on the scorekeeper's web-enabled mobile device, and the unique identifier comprises alphanumeric characters in the hyperlink.

In some preferred embodiments, the scoring method received in step (a) is hole scoring, and step (b) includes generating a unique identifier corresponding to each hole to be scored or corresponding to each group of holes to be scored.

In some preferred embodiments, the scoring method received in step (a) is tee group scoring, and step (b) includes generating a unique identifier corresponding to a tee time for each group to be scored.

In another aspect, the invention provides a method for scoring a sporting event implemented on a server computer having a processor and a memory. In a preferred embodiment, the method includes the following steps.

(a) Receiving and saving sporting event information for the sporting event to the memory.

(b) Receiving and saving to the memory scorekeeper information for each scorekeeper of the sporting event.

(c) Saving to the memory unique identifiers and associating certain unique identifiers with each of the scorekeepers.

(d) Receiving a request communicated to the server computer over a communications network, where the request seeks access to the server computer and includes a unique identifier and scorekeeper information.

(e) Verifying the request by checking that the unique identifier and scorekeeper information in the request match the unique identifier and associated scorekeeper information saved to the memory. If verified, access is granted to the server computer.

(f) Receiving and saving scores to the memory that were submitted by the scorekeepers over the communications network.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIG. 5 depicts an exemplary user interface screen for setting up a tournament;

FIG. 6 depicts an exemplary scorer management interface screen for managing scorekeepers and keys;

FIG. 7 depicts an exemplary scoring schedule display and scorekeeper screen associated with a particular key;

FIG. 8 depicts an exemplary score entry form that may be displayed on a scorekeeper's mobile device;

Figure 10:
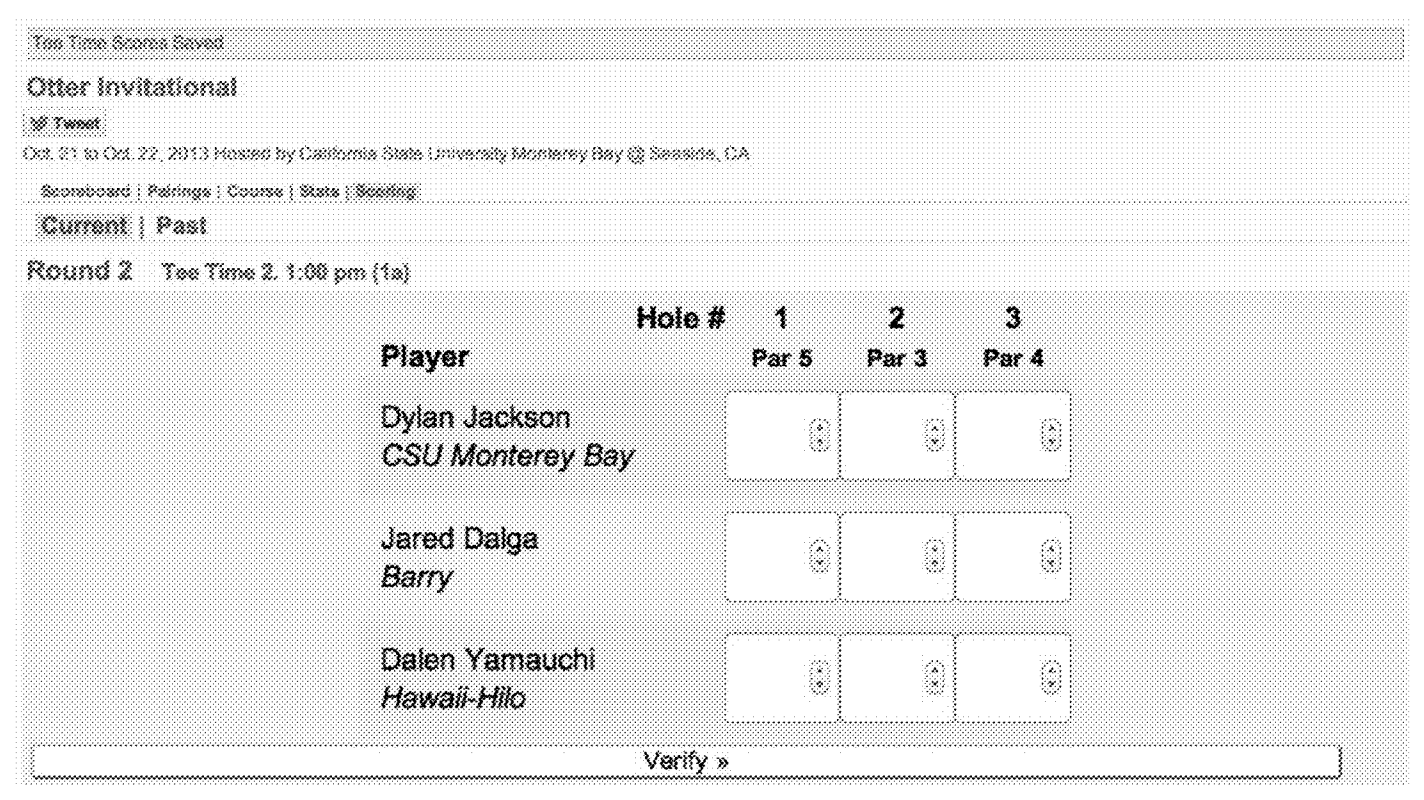

FIG. 10 depicts a second exemplary score entry form that may be displayed on a scorekeeper's mobile device; and FIG. 11 depicts a display screen for a single scorekeeper where previously entered scores are displayed and may be changed.

DETAILED DESCRIPTION

Figure 1:
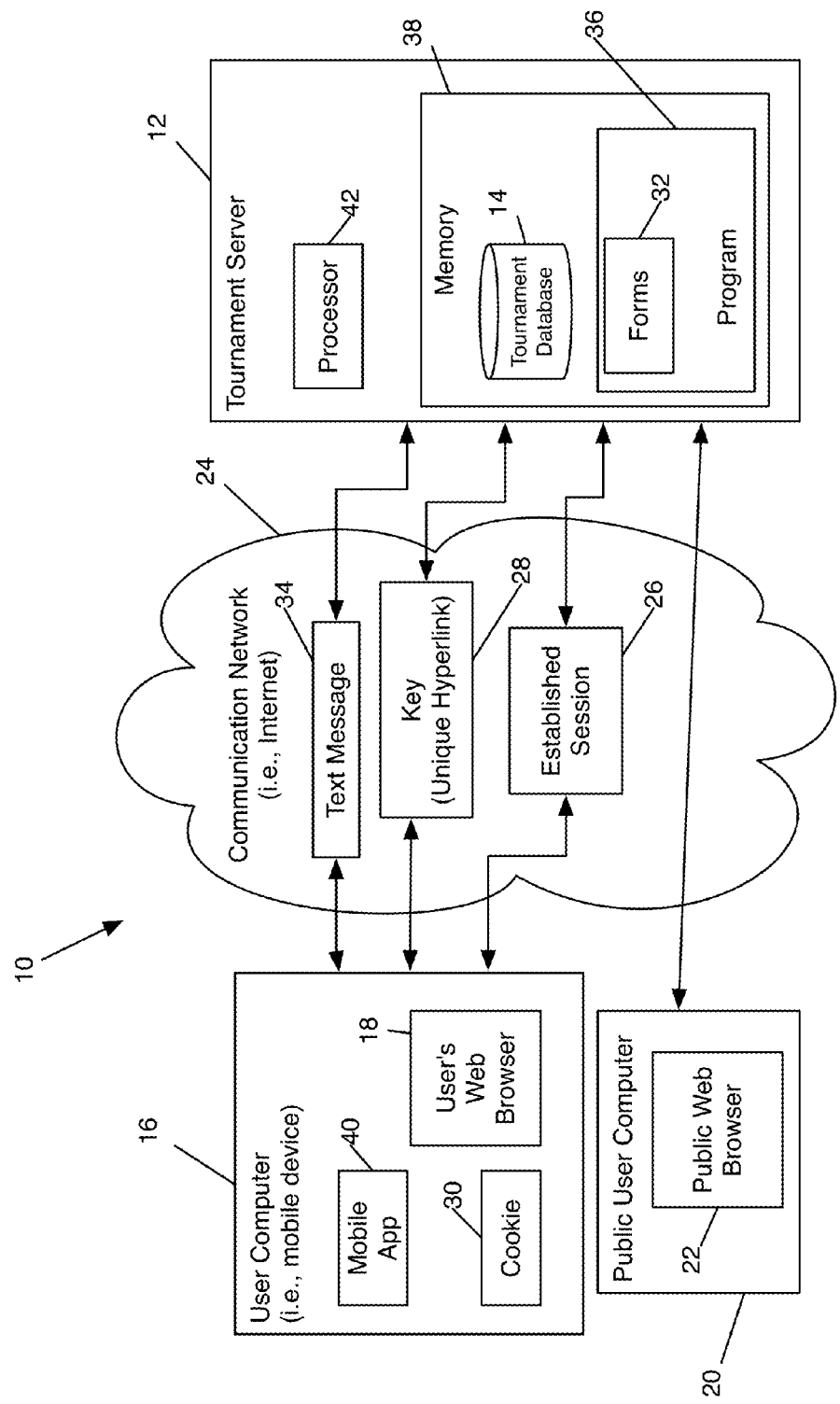
FIG. 1 depicts a block diagram of an exemplary web-based scoring system according to preferred embodiments of the invention.

Turning now to FIG. 1, there is illustrated a functional block diagram of one embodiment of a web-based scoring system 10 for scoring golf tournaments. The system 10 includes a tournament server 12 having a processor 42, memory 38 and a software program 36 having various modules capable of implementing the various aspects of the system 10 discussed herein. The server 12 also includes a tournament database 14 that interrelates data stored to the server. The server 12 communicates with scorekeeper computing devices 16, which may have access to a web browser 18, or a public user computer 20 having a web browser 22, all such communications conducted via a communication network 24, such as the Internet.

In general, by using the system 10, a tournament scorekeeper is granted access, through a secure remote connection, to the tournament server 12 and is permitted to upload score information for tournament events. These scores may be entered into HTML forms 32 that are created automatically by the program 36 and that are displayed as webpages on the scorekeeper's mobile device 16 in the web browser 18. The program 36 also generates a unique key 28 that may be provided to the scorekeeper as a hyperlink. A separate key 28 is created for each scorekeeper and each key 28 is associated with a particular tournament and tournament position, as described below.

The key 28 is preferably entered directly into the scorekeeper's mobile device 16 and submitted to the server 12. The server 12 receives the submission and the program 36 authenticates the key 28, establishes an authenticated user session 26, builds the HTML forms 32, and provides the scorekeeper with access to those forms. The scorekeeper then obtains score information from participants and uploads that information, via the forms 32, to the server 12. This information is verified and posted to various locations, such as a website or scoreboard, by the program 36. Once scores have been posted, the public may access the score information using the public user computer 20 via the public web browser 22.

Initialization

Figure 2:
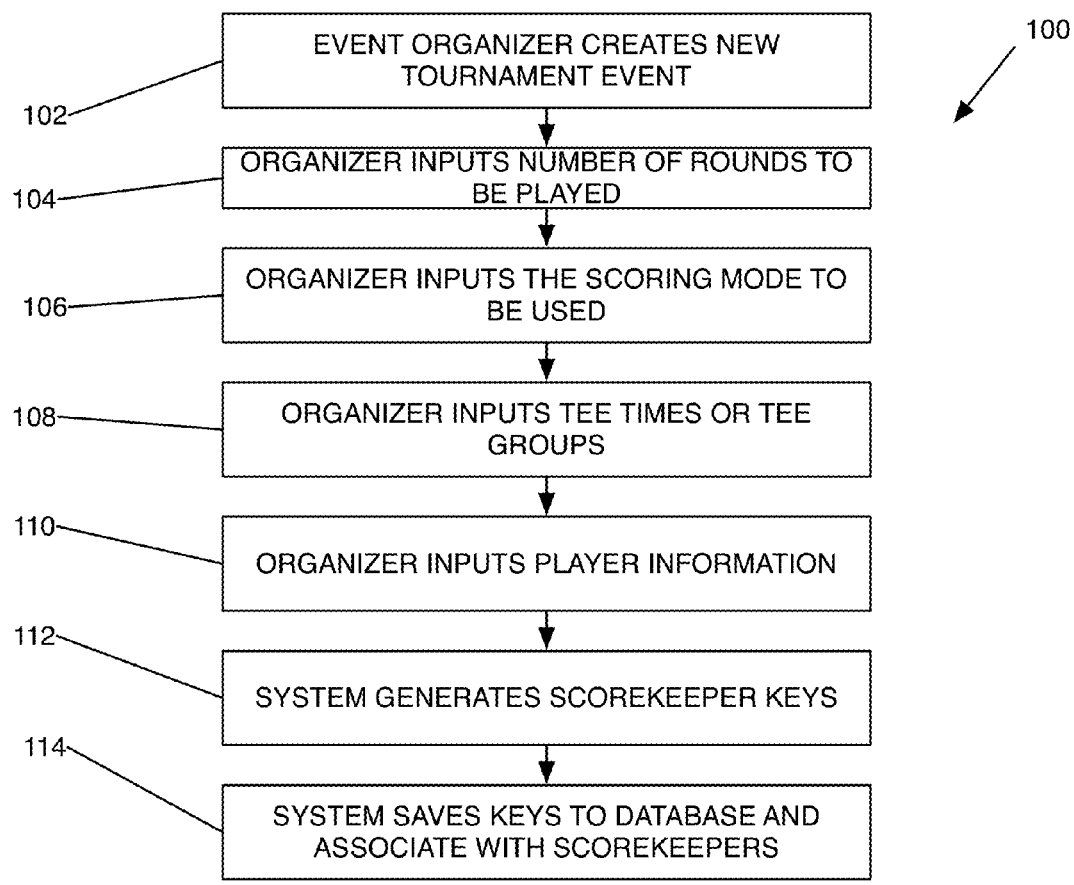
FIG. 2 is a flowchart of an exemplary process for initializing the web-based scoring system according to preferred embodiments of the invention.

FIG. 2 depicts a preferred embodiment of a process 100 of initializing the web-based scoring system 10. First, the tournament staff or event organizer (e.g., a school or league) sets up a tournament within the system 10 for a particular sporting event (i.e., a tournament) (Step 102). To do this, the tournament staff member may set up an account with a service provider whose server 12 hosts the program 36. The staff member logs on to their account via a public webpage and creates a new tournament event, an example of which is shown in FIG. 5. This same public webpage may also allow players to sign up with the system 10 and allow the public to view tournament information, such as player names and scores. The user must input certain information to organize a tournament including, for example, the date of the tournament, the course being played, the team and player order, the tee times, the time between tee times, the tee time layout, and the group size.

With continued reference to FIG. 2, certain information may be required, such as the number of rounds to be played (Step 104), the scoring method to be used in each round (Step 106), the tee times/tee groupings (Step 108), the number of players and the player/team information (Step 110). Once this information has been obtained, depending on the scoring mode chosen, the tournament organizer may provide, or the program 36 may automatically create, a schedule of the player order to be scored or the holes to be scored by the scorekeeper. As further described below, other information may be entered by third parties, such as players or scorekeepers.

Rounds may be played and scored by scorekeepers using at least two different scoring methods. In a first method, scorekeepers are stationed at certain locations around the golf course, where they remain throughout the entire competition. From that location, scorekeepers collect, record and input scores from each of the players as they pass by the scorekeepers' locations. Scorekeepers may collect scores from the players for a single hole or they may collect scores for several holes at the same time. In the description that follows, this first method may be referred to as "hole scoring."

In a second method, scorekeepers score a single group of players for all holes played. Each scorekeeper is assigned to a tee time (i.e., a particular group of players) and travels the course with that tee group from one hole to the next. At each hole, the scorekeeper records and inputs scores for each player of the group and then moves on to the next hole with the tee group. In the description that follows, this second method may be referred to as "tee group scoring."

The program 36 automatically generates an identifier or key 28 for each scorekeeper for the new tournament event (Step 112). These keys 28 are preferably automatically saved to the memory 38 in a table and are assigned to the scorekeepers (Step 114). Once saved to the table, keys 28 are also associated with a particular tournament, including a particular portion of that tournament to be scored (e.g., tournament round and hole number or tee time, depending on the scoring method), the current scoring position, and the assigned scorekeeper(s). The type and number of keys 28 generated may depend on the information entered during initialization, including the scoring method selected and the number of scorekeepers. For example, if tee group scoring is used, then a unique key 28 will be generated for each individual tee time. On the other hand, if hole scoring is used, a unique key 28 will be generated for each individual hole. Alternatively, if a scorekeeper is scoring multiple holes (e.g., holes 1 thru 3) at one time, a single unique key 28 is generated for all three holes collectively.

In another embodiment, the scoring method for the round is not setup in advance. Rather, the program 36 generates an identifier or key 28 for every possible scorekeeper for both hole scoring and tee group scoring as volunteer scorekeepers are recruited and their scoring preferences/locations are determined. This allows the tournament round to be scored using either scoring method or a combination that provides the best fit given the available volunteers and resources.

The keys 28 permit scorekeepers to access the servers 12 (after successfully completing a verification check), establish a connection with the servers 12, and enter scores. Each key 28 is unique and preferably includes a string of alphanumeric characters. In certain embodiments, the keys 28 are manually entered into text boxes. As depicted in FIG. 6, keys 28 are preferably included as part of a hyperlink that is provided to each assigned scorekeeper. For example, if the service provider's website is located at the web address "www.example.com", the link provided to the scorekeeper may be "www.example.com/123ABC," where "123ABC" is the key 28.

In another embodiment, a scorekeeper's credentials (i.e., user name and password) for signing into the system 10 may be generated according to a specific formula that applies to all tournament events. This formula may change depending on the type of scoring (i.e., tee group vs. hole) that is used. For example, the key 28 may include a web address that is standard for all scorekeepers, except for a final portion of the address that is different for each scorekeeper or for each portion of the tournament event and which may be determined according to a formula. For example, the username and/or password may include the tournament name, round number and group number. If the tournament is the "Otter Invitational" and the scorekeeper is scoring the first group in the fourth round, the key 28 determined by the formula may determine the username to be "Otter_4_1." The password may include a number of different components and combinations of components and alphanumeric characters.

In yet another embodiment, the scorekeeper's credentials (such as the keys 28) are created and entered manually by the tournament administrative users and stored in the database. This is an alternative to creating the keys 28 randomly or using a formula to create them.

In the example shown in FIG. 6, six scorekeepers have been assigned to score 18 holes in groups of three holes each. Thus, six keys 28 have been generated. Each key 28 has a different string of alphanumeric characters (e.g., 4cad, a4dc, 8f69, etc.) at the end of the link. Each link is associated with a different 3-hole grouping. While scoring this tournament, scorekeepers would likely be located at the green of the final hole to which they are assigned and where they would collect scores for each of the three previous holes. For example, the first scorekeeper, whose link includes the key "4cad" and who is scoring holes 1, 2 and 3, would be positioned at the green for hole 3 and would collect scores for holes 1, 2, and 3 from each of the groups in the tournament. Alternatively, if scorekeepers were assigned to a particular tee group, one link would be provided for each tee group.

FIG. 7 depicts an example schedule of tee groups to be scored by the scorekeeper associated with the link that includes the key "4cad," which is for holes 1, 2, and 3. The program 36 preferably generates this listing automatically once all required information is saved to the server 12. The schedule provides the group and players at each scoring position, and the starting hole for each of those groups. As the rounds progress, scores entered by the scorekeeper may be automatically entered into this schedule to show which groups (i.e., scoring positions) have been scored already.

Authentication

Figure 3:
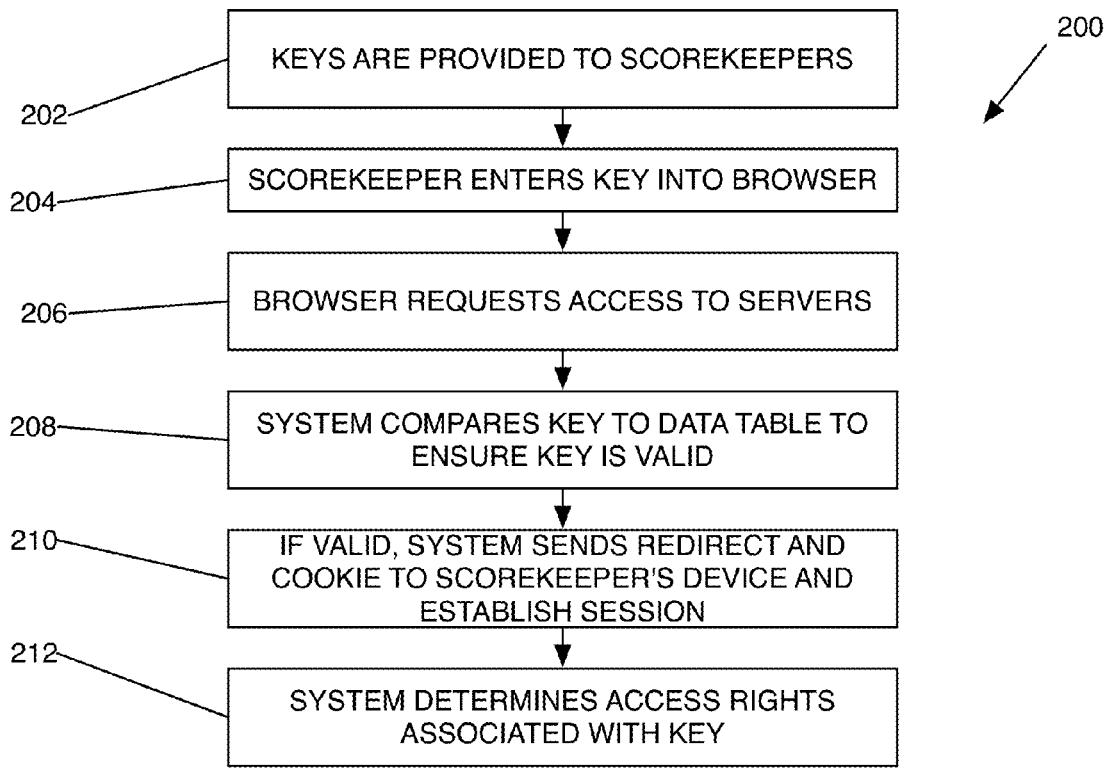
FIG. 3 is a flowchart of an exemplary process for authenticating a user of the web-based scoring system according to preferred embodiments of the invention.

Before a scorekeeper is permitted to access the server 12 or to enter scores, the scorekeeper may be required to successfully pass a verification check that ensures that he/she is an approved user of the system 10. Once verified, an authenticated session 26 between the scorekeeper's mobile device 16 and the server 12 is established. FIG. 3 depicts the steps undertaken in a preferred embodiment of this authenticating process 200.

Prior to scoring the tournament event, a key 28 is provided to each of the scorekeepers (Step 202). For example, scorekeepers may arrive at the golf tournament and physically receive a hyperlink that includes the key 28 (e.g., on paper) or electronically receive the key (e.g., via text message or email message, etc.). The scorekeeper may then enter the key 28 into their mobile device 16 (Step 204). For example, the person may enter a web address that includes a key 28 into a web browser 18 or click a link sent via email or text message.

The browser 18 then sends a request including the key 28 to the server 12 requesting access (Step 206). Once the server 12 receives the request, it verifies that the key 28 accompanying that request is valid by comparing it to the information stored in the database 14 (Step 208). If the key 28 is valid, the server 12 creates a session by generating a cookie 30 and linking the received key 28 to the newly-generated cookie 30 in the database 14. The server 12 then sends the cookie 30 back to the browser 18 on the scorekeeper's mobile device 16 with a redirect to the scoring page URL (Step 210). The browser 18 then sends a request with the cookie back to the server 12 to access the scoring page URL.

The system 10 stores information in the database 14 linking the cookie 30 with the key 28. This allows the system 10 to determine the key 28 based on the cookie 30 without the browser 18 having to explicitly communicate the key 28 with every request. The cookie 30 is then included in every communication between the browser 18 and the server 12 thereafter, establishing an authenticated session 26 between the browser 18 and server 12. When the server 12 receives a cookie 30 it compares it to the information stored in the database 14 to retrieve the key 28.

Continuing at Step 212, based on cookie in the request, the server 12 retrieves the associated key 28 from the database 14, and based on the key 28, the server 12 determines access rights, including read and write access rights for the database 14. In particular, based on the key 28, the system 10 identifies and grants access to a particular tournament, a particular round, and a scoring position of the tournament associated with that key 28. In certain embodiments, the system 10 may validate the access rights of a cookie 30 and its associated key 28 for every single request made to the server 12 with that cookie 30.

In certain embodiments, the system 10 may authenticate the key 28 contained in the request using the media access control (MAC) address associated with the scorekeeper's mobile device 16. During the aforementioned tournament setup phase, the tournament organizer may include the MAC address of scorekeeper's mobile device 16 in the table in order to facilitate this verification process. During the verification check, the system 10 compares the MAC address accompanying a request and a key 28 with the MAC address saved to the table. If all of the information matches, the request is verified.

The cookie 30 is saved to the scorekeeper's device 16 and provides continuous, uninterrupted access to the system 10, forms, etc. until the established session 26 expires. For example, once a connection with the server 12 has been authenticated, an established session 26 may last for two hours. During those two hours, the scorekeeper may open and close the web browser 18 without the system 10 re-authenticating the key 28. After two hours, the system 10 may require that the key 28 be re-authenticated in order to establish a new session 26. This occasional re-authentication process is useful for ensuring that the tournament event and accompanying webpages and forms are still active and valid. For example, if the tournament event is no longer active, the scorekeeper will receive an error message or some other similar indication and no session 26 will be established. In the preferred embodiment, the session 26 expiration window or 'Max-Age' value of the cookie 30 is reset to the default value for the system 10 (two hours in the above example) on every communication between the browser 18 and the server 12.

Once access is granted to the scorekeeper, and an established session 26 is established between the scorekeeper's computer 16 and the tournament server 12, that scorekeeper is permitted to upload score information for that particular tournament event. Since the key 28 has been verified automatically by the system 10, the scorekeeper preferably is not required to provide any further credentials, such as a password or user name, in order to access the system 10. Rather, using the key 28 provided, the scorekeeper is granted access to the system 10 immediately with no other intervening steps needed.

In an alternative embodiment, the system 10 is configured to receive or transmit information via text/SMS messages. This may be particularly useful for scorekeepers whose mobile device 16 is not a smartphone or other web-connected device. In this embodiment, the phone number associated with the scorekeeper's phone may replace the MAC address in the verification process. Therefore, instead of the system 10 recognizing and linking via the MAC address of the scorekeeper device 16 in response to receiving a URL or hyperlink having the correct key 28, it is linked via the phone number. In this embodiment, the scorekeeper may send or receive information to the tournament database 14 via text message 34.

Scoring & Posting

As discussed above, once a scorekeeper's request for access to the server 12 has been authenticated, the program 36 automatically determines what tournament and tournament position is associated with the key 28 linked to the cookie in the incoming request. For example, if the received key 28 is assigned to holes 4, 5 and 6 of tournament round 2, the program 36 determines what group of players (i.e., tee group) will be scored next at these holes (i.e., the current scoring position). The program 36 automatically makes this determination by reviewing information saved to the server 12, including the order of groups and the scores entered and saved to the database 14, if any.

Also, as mentioned previously, the server 12 sends a browser cookie 30 and a redirect to the scorekeeper's mobile device 16 (Step 210). The redirect automatically points the scorekeeper's web browser 18 to a webpage that includes a form where the scorekeeper can enter scores, and this scorekeeper is granted access to modify those forms and enter scores into the system 10. Preferably the electronic (i.e., HTML) scoring forms 32 are automatically generated by the program 36 based on information saved to the memory 38, including the current scoring position and the scored entered and saved to the server 12.

Figure 4:
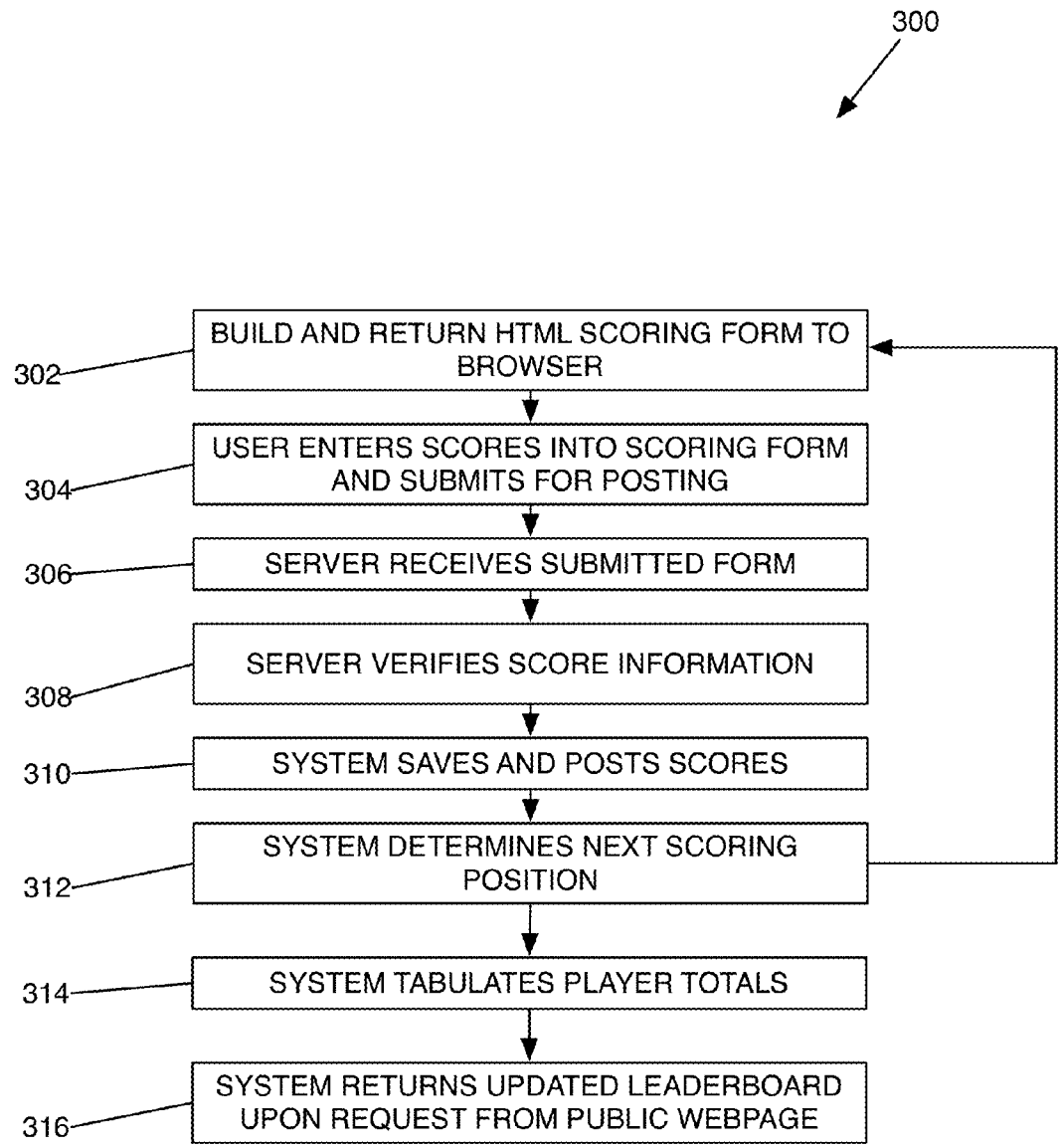
FIG. 4 is a flowchart of an exemplary process for scoring and posting scores using the web-based scoring system according to preferred embodiments of the invention.
Figure 9:
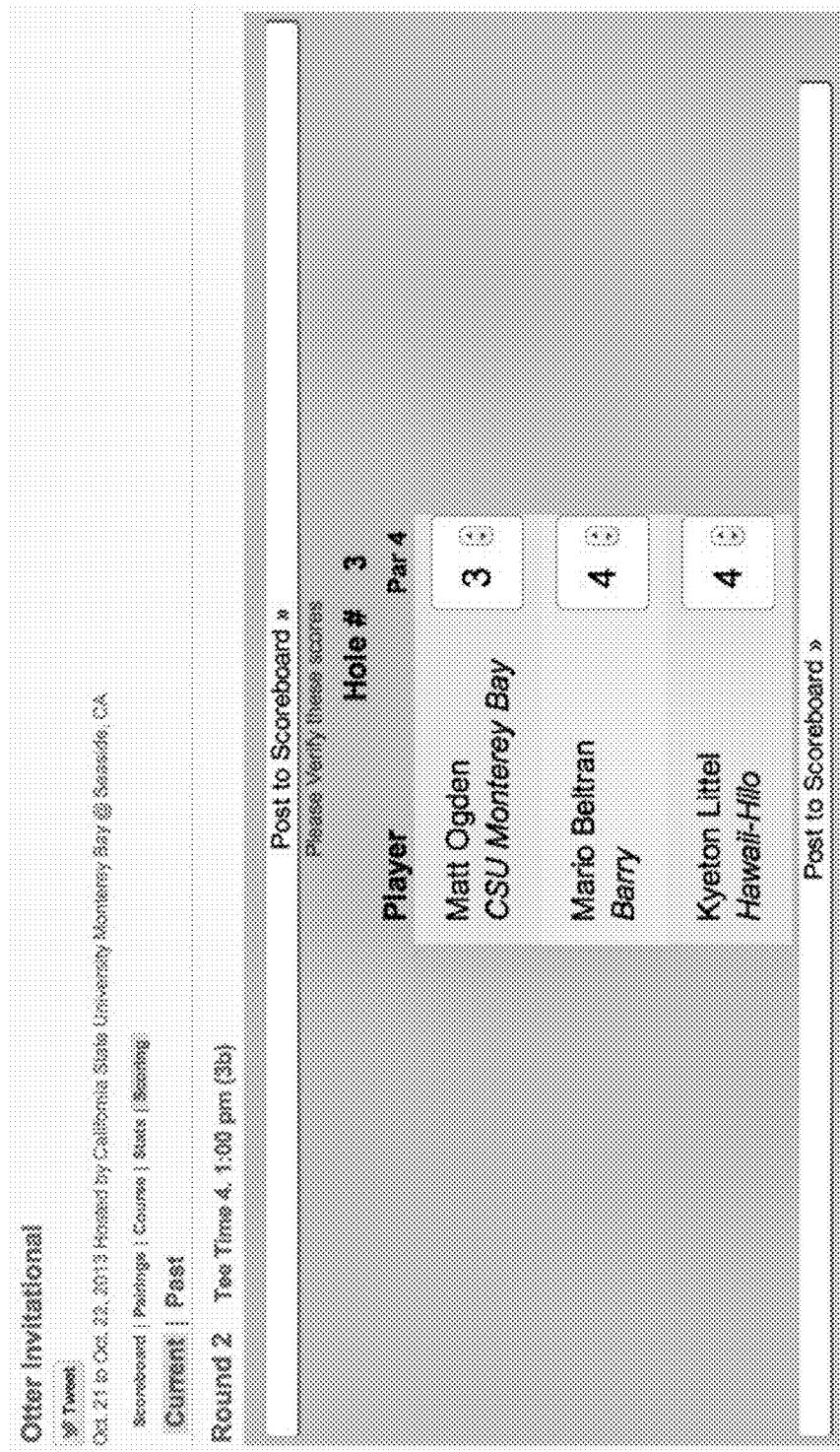
FIG. 9 depicts a exemplary score verification form that may be displayed on a scorekeeper's mobile device after scores have been entered.

FIG. 4 depicts the steps undertaken in the scoring and posting process 300 of a preferred embodiment. The forms 32 are systematically displayed on the scorekeeper's mobile device 16 as a custom webpage for each of the scoring positions (Step 302). In an alternative embodiment, the system 10 may include a mobile application 40 that is designed to display forms 32 and to exchange information between the scorekeeper device 16 and the server 12.

Forms 32 are preferably formatted to receive scores for a single scoring position. Separate, unique forms 32 are generated automatically by the system 10 for each scorekeeper and for each position of the tournament. For example, if a scorekeeper is scoring the 9:23 A.M. tee group on a course of 18 holes, there would be 18 scoring positions (i.e., one for each of the 18 holes). On the other hand, if the scorekeeper is scoring holes 4, 5 and 6, the number of scoring positions would depend on the number of tee groups that would play through those designated holes. The form 32 returned in both cases would depend on the scoring position for that particular scorekeeper.

The scorekeeper may then enter scores into the form 32, verify that the scores entered are correct, and submit the scores for posting (Step 304). Once the scores have been submitted for posting, they are transmitted in a request with the cookie 30 to the tournament server 12 over the Internet 24 and are received by the server 12 (Step 306). Based on the cookie 30, the server 12 retrieves the associated key 28 from the database 14 to verify that the scores received are valid (Step 308). Based on the key 28, the server 12 determines the tournament, tournament round, and scoring position access. The server 12 determines the current scoring position and validates that the received scores are for the current scoring position.

Figure 11:
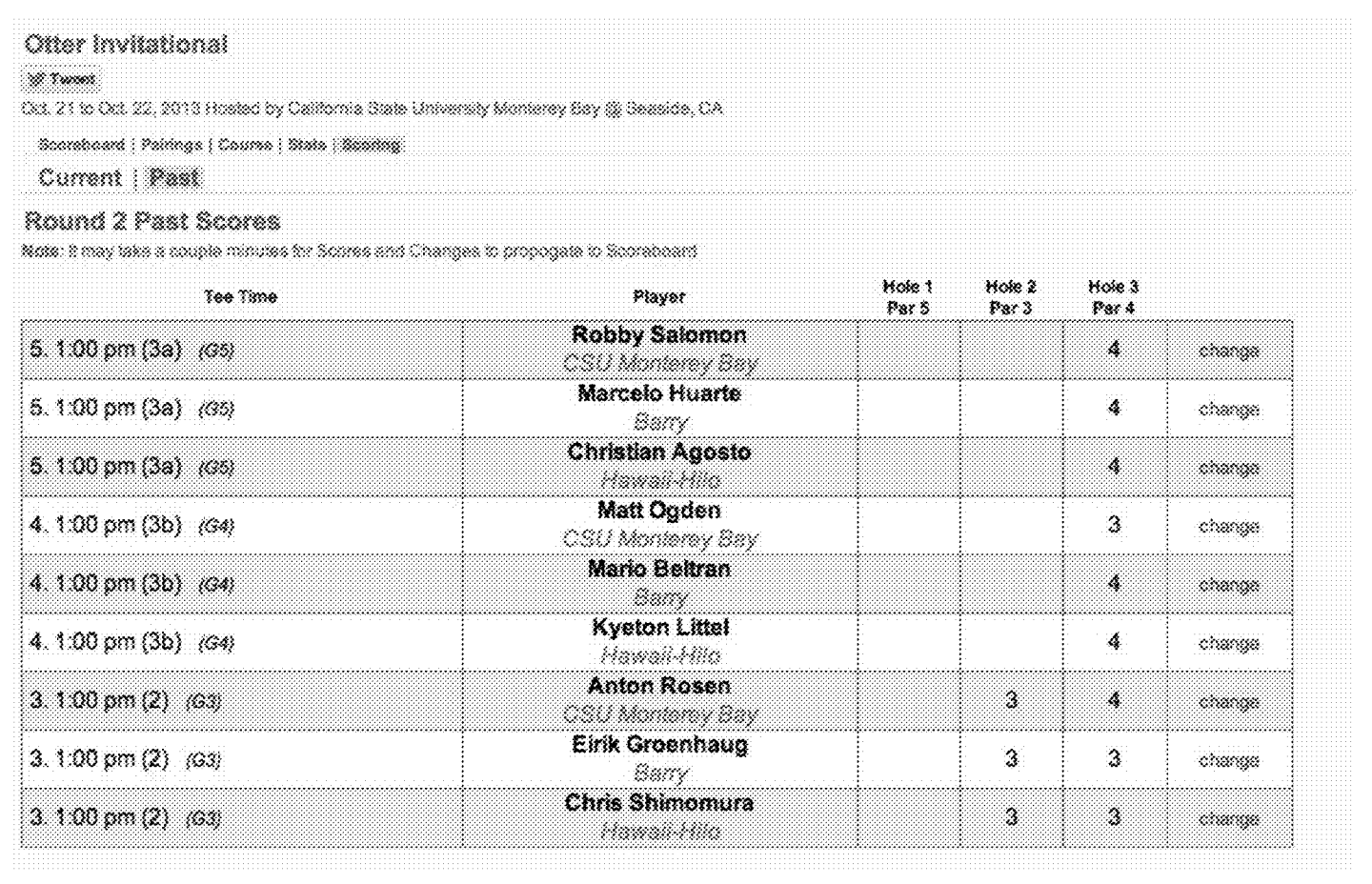

If the scores submitted are valid, the program 36 saves the scores to the database 14 and posts the newly entered scores as depicted in FIG. 11 (Step 310). The program 36 also preferably calculates the current overall scores for all of the players (Step 314). This step may occur after each form 32 has been submitted or it may occur after all forms have been submitted. Automatically or upon request from a public webpage 22, the overall scores may then be posted to a tournament scoreboard and displayed on a publicly accessible leaderboard or the publicly accessible webpage (Step 316). In some embodiments, the scores are held and not posted until a tournament official has verified the accuracy of the scores submitted. Preferably, the program 36 provides for manual correction of incorrect scores that may have been submitted and posted.

After a form 32 has been submitted, the system 10 determines the next scoring position for that scorekeeper (Step 312), automatically generates the appropriate form 32 for the scorekeeper's next position, and automatically sends it to the scorekeeper (Step 302). This process repeats until there are no further scoring positions (i.e., all tee groups have been scored or all holes have been played). If there are no more positions to score, then scoring is complete and no more forms 32 are provided to the scorekeeper.

As mentioned earlier, multiple authenticated scorekeepers using multiple devices 16 may use the same key 28 in order to gain access to the same form 32. This may occur, for example, if the scheduled scorekeeper was unable to attend or had to leave while the scoring was only partially complete. However, the program 36 prevents duplicate entries by verifying that the scores being entered have not already been submitted. If the scores being submitted are for an incorrect or previously completed scoring position, the program 36 will not save or post the submitted scores. Preferably, an error is returned by the program 36 in that situation.

In addition to accessing the scoring forms 32 discussed above, any user can also access the public web content of the tournament scoreboard in order to view the tournament scoreboard. A link may be provided on the public web content which would enable the scorekeeper to easily return to the current scoring form. There may also be links that permit scorekeepers to upload additional information to the tournament database including, for example, notes or photographs.

Additionally, the forms 32 may include links or buttons that permit the scorekeeper to contact or request assistance from a third party, such as a rules official, a tournament organizer or emergency services, such as police or paramedics. In an alternative embodiment, the system 10 permits two-way communications for scorekeepers. For example, if a rules official or tournament official is needed at hole 3 for a ruling, an alert or message may be sent out by the scorekeeper who is requesting assistance. This communication may be in the form of a text message, and it may be directed to a particular individual, such as a rules official, or it may be broadcast to several individuals at the same time. In an alternative embodiment, the two-way communication feature could be used by the tournament officials to communicate with scorekeepers, either individually or as a group.

The system 10 has been shown and described as being used for the game of golf. However, this scoring system could be used for other sporting events. For example, this system may used for baseball games, tennis matches, or any other sporting event where live scoring that is accessible on the Internet is a value added and the cost of developing or providing a rigid process or technology for scorekeepers is cost- or time-prohibitive.

What is claimed is:

1. A web-based scoring method for scoring a golf tournament implemented on a tournament server computer and a web-enabled mobile device, wherein the tournament server computer includes a processor, a memory, a database, and a software program comprising computer-executable code that when executed causes the processor to perform scoring operations, and wherein the web-enabled mobile device is in communication with the tournament server computer via a communication network, the method comprising:
   (a) receiving and storing to the memory of the tournament server information related to a golf tournament, the information comprising tee group players, and tee group order;
   (b) generating and storing to the memory of the tournament server one or more unique identifiers that are associated with a corresponding scoring position;
   (c) submitting a request from the web-enabled mobile device to the tournament server via the communication network, the request including one of the one or more unique identifiers;
   (d) receiving the request at the tournament server;
   (e) determining the scoring position associated with the unique identifier;
   (f) generating a web-based form for the current scoring position, the web-based form including data entry fields for one of the tee groups and a subset of holes based at least in part on tee group and hole data previously received by the tournament server in association with the unique identifier, including player names in a next succeeding unscored tee group, and a next succeeding unscored hole for the players in the tee group;
   (g) displaying the web-based form on the web-enabled mobile device;
   (h) entering score information for the scoring position on the web-based form using the web-enabled mobile device;
   (i) submitting the web-based form with the score information for the scoring position to the tournament server via the communication network;
   (j) receiving at the tournament server the web-based form having the score information, and saving the score information to the memory;
   (k) repeating steps (c)-(j) until score information for all scoring positions for the tournament has been submitted to the tournament server; and
   (l) tabulating the score information submitted on the web-based forms to determine total scores for the players in the tournament and posting the scores to a publicly accessible webpage.

2. The method of claim 1 wherein the one or more unique identifiers are delivered to a scorekeeper via one or more of an email message, a text message, a web page and a paper message.

3. The method of claim 1 wherein the unique identifier comprises a hyperlink entered into a browser application running on the web-enabled mobile device.

4. A tournament server for scoring a golf tournament, the server comprising:
   a processor for running a software program,
   a memory for storing the software program and a database of tournament information,
   a network connection for connecting the server to a network and sending data to and receiving data and requests from a remote device, and
   the software program comprising computer-executable code that when executed causes the processor to perform operations, comprising:
      (a) storing in the database tee group players and tee group order,
      (b) storing in the database unique identifiers that are associated with a corresponding scoring position, (c) receiving a request from the remote device, the request including one of the unique identifiers,
(d) determining a scoring position associated with the unique identifier,
(e) generating a web-based form for the scoring position, the web-based form including data entry fields for one of the tee groups and a subset of holes based at least in part on tee group and hole data previously received by the tournament server in association with the unique identifier, including player names in a next succeeding unscored tee group, and a next succeeding unscored hole for the players in the tee group,
(f) receiving the score information back from the remote device,
(g) saving the score information to the database,
(h) repeating steps (c)-(g) until score information for all scoring positions for the tournament has been submitted to the server, and
(i) posting the score information to a publicly accessible webpage.

5. The server of claim 4 wherein the unique identifier is delivered to a scorekeeper via at least one of an email message, a text message, a web page, and a paper message.

6. The server of claim 4 wherein the unique identifier comprises a hyperlink to be entered into a browser application running on the remote device.

7. A non-transient computer readable medium containing a software program that when executed causes the processor to perform operations for scoring a golf tournament, comprising:

(a) storing in a database tee group players and tee group order,
(b) storing in the database unique identifiers that are associated with a corresponding scoring position,
(c) receiving a request from a remote device, the request including one of the unique identifiers,
(d) determining a scoring position associated with the unique identifier,
(e) generating a web-based form for the scoring position, the web-based form including data entry fields for one of the tee groups and a subset of holes based at least in part on tee group and hole data previously received by the tournament server in association with the unique identifier, including player names in a next succeeding unscored tee group, and a next succeeding unscored hole for the players in the tee group,
(f) receiving the score information back from the remote device,
(g) saving the score information to the database,
(h) repeating steps (c)-(g) until score information for all scoring positions for the tournament has been submitted to the server, and
(i) posting the score information to a publicly accessible webpage.

8. The medium of claim 7 wherein the unique identifier is delivered to a scorekeeper via at least one of an email message, a text message, a web page, and a paper message.

9. The medium of claim 7 wherein the unique identifier comprises a hyperlink to be entered into a browser application running on the remote device.

* * * * *